(12) United States Patent
Wang

(10) Patent No.: US 12,365,778 B2
(45) Date of Patent: Jul. 22, 2025

(54) METHODS OF IMPROVING LOFTING AGENT RETENTION USING BICOMPONENT FIBERS

(71) Applicant: HANWHA AZDEL, INC., Forest, VA (US)

(72) Inventor: Ruomiao Wang, Forest, VA (US)

(73) Assignee: Hanwha Azdel, Inc., Forest, VA (US)

( * ) Notice: Subject to any disclaimer, the term of this patent is extended or adjusted under 35 U.S.C. 154(b) by 134 days.

(21) Appl. No.: 18/135,254

(22) Filed: Apr. 17, 2023

(65) Prior Publication Data

US 2024/0092988 A1 Mar. 21, 2024

Related U.S. Application Data

(63) Continuation of application No. 16/778,080, filed on Jan. 31, 2020, now Pat. No. 11,634,550.

(60) Provisional application No. 62/800,307, filed on Feb. 1, 2019.

(51) Int. Cl.
| | | |
|---|---|---|
| *C08J 9/32* | (2006.01) | |
| *C08J 5/04* | (2006.01) | |
| *C08J 9/00* | (2006.01) | |
| *C08J 9/35* | (2006.01) | |
| *D01F 8/12* | (2006.01) | |
| *D01F 8/14* | (2006.01) | |

(52) U.S. Cl.
CPC ............ *C08J 9/0085* (2013.01); *C08J 5/043* (2013.01); *C08J 5/046* (2013.01); *C08J 9/32* (2013.01); *C08J 9/35* (2013.01); *D01F 8/12* (2013.01); *D01F 8/14* (2013.01); *C08J 2201/02* (2013.01); *C08J 2201/0504* (2013.01); *C08J 2203/22* (2013.01); *C08J 2205/05* (2013.01)

(58) Field of Classification Search
CPC . C08J 9/0085; C08J 5/043; C08J 5/046; C08J 9/35; C08J 9/32; C08J 2201/02; C08J 2201/0504; C08J 2203/22; C08J 2205/05; C08J 9/0061; C08J 2323/02; C08J 2423/06; C08J 2467/00; C08J 2477/00; C08J 9/00; D01F 8/12; D01F 8/14; D01F 8/06; B27N 3/005; B27N 1/00; B27N 3/04; B27N 3/18; B27N 7/005; B27N 9/00; B29C 70/08; B29C 44/22; B29C 44/322; B29C 44/445; B29C 44/54; B29C 70/00; B29C 70/086; B29C 44/24; B29C 67/20; B29C 70/34; B29K 2023/06; B29K 2067/003; B29K 2067/006; B29K 2077/00; B29K 2105/0076; B29K 2105/045; B29K 2105/048; B29L 2007/002
USPC ...................................... 428/311.51
See application file for complete search history.

(56) References Cited

U.S. PATENT DOCUMENTS

| | | | | |
|---|---|---|---|---|
| 5,364,686 A | * | 11/1994 | Disselbeck ........... | B29C 51/004 442/318 |
| 11,634,550 B2 | * | 4/2023 | Wang ................ | D01F 8/12 428/311.51 |
| 2009/0233508 A1 | * | 9/2009 | Kubota ................ | C08J 5/248 156/308.2 |
| 2018/0162107 A1 | * | 6/2018 | Xu ................ | B32B 25/045 |

OTHER PUBLICATIONS

Incredible Facts about Linear Low Density Polyethylene, TERRACAST, Published online Sep. 15, 2016 (Year: 2016).*

* cited by examiner

*Primary Examiner* — Hannah J Pak
(74) *Attorney, Agent, or Firm* — Rhodes IP PLC; Christopher Rhodes

(57) ABSTRACT

Methods of forming a lightweight reinforced thermoplastic core layer and articles including the core layer are described. In some examples, the methods use a combination of thermoplastic material, reinforcing fibers and bicomponent fibers to enhance retention of lofting agents in the core layer. The processes permit the use of less material while still providing sufficient lofting capacity in the final formed core layer.

20 Claims, 5 Drawing Sheets

METHODS OF IMPROVING LOFTING AGENT RETENTION USING BICOMPONENT FIBERS

PRIORITY APPLICATION

This application is related to, and claims priority to and the benefit of, U.S. Provisional Application No. 62/800,307 filed on Feb. 1, 2019, the entire disclosure of which is hereby incorporated herein by reference.

TECHNOLOGICAL FIELD

Certain embodiments are directed to methods of improving lofting agent retention in thermoplastic composite articles. More particularly, some examples describe methods used to produce thermoplastic composite articles with enhanced retention of lofting agents within thermoplastic composite articles.

BACKGROUND

Certain automotive and building applications often use thermoplastic based materials in place of conventional steel or metal articles. The use of thermoplastic based materials can create unique considerations not encountered with steel or metal articles.

SUMMARY

Certain aspects are described herein to illustrate some configurations and methods to produce lightweight reinforced thermoplastic composite articles.

In an aspect, a method of producing a porous composite article comprises combining inorganic reinforcing fibers, organic reinforcing fibers and a thermoplastic material in a liquid to produce an aqueous foam, wherein the organic reinforcing fibers comprise a core-shell arrangement, wherein a shell material in the shell of the core-shell arrangement comprises a melting point that is substantially similar to a melting point of the thermoplastic material, and wherein a core material in the core of the core-shell arrangement comprises a melting point that is at least twenty degrees Celsius higher than the melting point of the thermoplastic material. The method can also comprise depositing the aqueous foam onto a moving wire screen. The method can also comprise removing liquid from the deposited aqueous foam on the moving wire screen to form a web of open cell structures formed from the thermoplastic material, the inorganic reinforcing fibers and the organic reinforcing fibers. The method can also include depositing a lofting agent onto the formed web. The method can also include compressing the formed web comprising the deposited lofting agent to provide the porous composite article.

In certain examples, the method comprises using a negative pressure provided at a bottom surface of the formed web during depositing of the lofting agent to draw lofting agent into voids of the formed web. In other examples, at least 50% of the deposited lofting agent is retained by the formed web. In some embodiments, the organic reinforcing fibers comprise a shell comprising a polyolefin and a core comprising a polyester. In other embodiments, the polyolefin comprises a polyethylene. In certain examples, the polyethylene is linear low density polyethylene. For example, a density of the linear low density polyethylene is about 0.91 g/cm3 to about 0.94 g/cm3. In some examples, the polyester comprises one or more of polyethylene terephthalate, polybutylene terephthalate and polynaphthalene terephthalate.

In other examples, the organic reinforcing fibers comprise a shell comprising a polyolefin and a core comprising a polyamide. In certain instances, the polyolefin comprises a polyethylene. In some examples, the polyethylene is linear low density polyethylene. For example, a density of the linear low density polyethylene is about 0.91 g/cm3 to about 0.94 g/cm3. In some examples, the polyamide comprises a co-polyamide. In some examples, the polyamide comprises nylon.

In some embodiments, the thermoplastic material comprises a polyolefin, the inorganic reinforcing fibers comprise glass fibers, the organic reinforcing fibers comprises a polyolefin in the shell and a polyester in the core, and wherein the lofting agent comprises expandable microspheres. In some examples, the thermoplastic material is polypropylene, the polyolefin of the shell comprises polyethylene and the polyester of the core comprises polyethylene terephthalate.

In other embodiments, the thermoplastic material comprises a polyolefin, the inorganic reinforcing fibers comprise glass fibers, the organic reinforcing fibers comprises a polyolefin in the shell and a polyamide in the core, and wherein the lofting agent comprises expandable microspheres. In some examples, the thermoplastic material is polypropylene, the polyolefin of the shell comprises polyethylene and the polyamide of the core comprises nylon.

In some examples, the thermoplastic material comprises polypropylene, the inorganic reinforcing fibers comprise glass fibers, the organic reinforcing fibers comprise a polyethylene in the shell and a polyester in the core, wherein a melting point of the polyester in the core is at least fifty degrees Celsius higher than a melting point of the polyethylene in the shell, wherein the lofting agent comprises expandable microspheres, and wherein the porous thermoplastic composite article comprises a porosity of 20% to 80%, In certain examples, the thermoplastic material comprises polypropylene, the inorganic reinforcing fibers comprise glass fibers, the organic reinforcing fibers comprise a polyethylene in the shell and a polyamide in the core, wherein a melting point of the polyamide in the core is at least fifty degrees Celsius higher than a melting point of the polyethylene in the shell, wherein the lofting agent comprises expandable microspheres, and wherein the porous thermoplastic composite article comprises a porosity of 20% to 80%.

In another aspect, a method of producing a porous composite article comprises combining inorganic reinforcing fibers, organic reinforcing fibers and a thermoplastic material in a liquid to produce an aqueous foam, wherein the organic reinforcing fibers comprise a side-by-side arrangement, wherein a first fiber in the side-by-side arrangement comprises a melting point that is substantially similar to a melting point of the thermoplastic material, and wherein a second fiber of the side-by-side arrangement comprises a melting point that is at least twenty degrees Celsius higher than the melting point of the thermoplastic material. The method can also comprise depositing the aqueous foam onto a moving wire screen. The method can also comprise removing liquid from the deposited aqueous foam on the moving wire screen to form a web of open cell structures formed from the thermoplastic material, the inorganic reinforcing fibers and the organic reinforcing fibers. The method can also comprise depositing a lofting agent onto the formed web. The method can also comprise compressing the formed web comprising the deposited lofting agent to provide the porous composite article.

In certain embodiments, a negative pressure can be provided at a bottom surface of the formed web during depositing of the lofting agent to draw lofting agent into voids of the formed web. In some examples, at least 50% of the deposited lofting agent is retained by the formed web. In some examples, the first fiber of the organic reinforcing fibers comprise a polyolefin and the second fiber of the organic reinforcing fibers comprise a polyester. In other examples, the polyolefin comprises a polyethylene. In some examples, the polyethylene is linear low density polyethylene. For example, a density of the linear low density polyethylene is about 0.91 g/cm3 to about 0.94 g/cm3. In some examples, the polyester comprises one or more of polyethylene terephthalate, polybutylene terephthalate and polynaphthalene terephthalate.

In certain examples, the first fiber of the organic reinforcing fibers comprise a polyolefin and the second fiber of the organic reinforcing fibers comprise a polyamide. In some instances, the polyolefin comprises polyethylene. In other examples, the polyethylene is linear low density polyethylene. In certain examples, a density of the linear low density polyethylene is about 0.91 g/cm3 to about 0.94 g/cm3. In some embodiments, the polyamide comprises a co-polyamide. In some examples, the polyamide comprises nylon.

In other examples, the thermoplastic material comprises a polyolefin, the inorganic reinforcing fibers comprise glass fibers, the organic reinforcing fibers comprises a first fiber comprising a polyolefin and a second fiber comprising a polyester, and wherein the lofting agent comprises expandable microspheres. In some examples, the thermoplastic material is polypropylene, the polyolefin of the first fiber comprises polyethylene and the polyester of the second fiber comprises polyethylene terephthalate.

In certain embodiments, the thermoplastic material comprises a polyolefin, the inorganic reinforcing fibers comprise glass fibers, the organic reinforcing fibers comprises a first fiber comprising a polyolefin and a second fiber comprising a polyamide, and wherein the lofting agent comprises expandable microspheres. In some examples, the thermoplastic material is polypropylene, the polyolefin of the first fiber comprises polyethylene and the polyamide of the second fiber comprises nylon.

In certain embodiments, the thermoplastic material comprises polypropylene, the inorganic reinforcing fibers comprise glass fibers, the organic reinforcing fibers comprise a first fiber comprising a polyethylene and a second fiber comprising a polyester, wherein a melting point of the polyester in the second fiber is at least fifty degrees Celsius higher than a melting point of the polyethylene in the first fiber, wherein the lofting agent comprises expandable microspheres, and wherein the porous thermoplastic composite article comprises a porosity of 20% to 80%, In other embodiments, the thermoplastic material comprises polypropylene, the inorganic reinforcing fibers comprise glass fibers, the organic reinforcing fibers comprise a first fiber comprising a polyethylene and a second fiber comprising a polyamide, wherein a melting point of the polyamide in the second fiber is at least fifty degrees Celsius higher than a melting point of the polyethylene in the first fiber, wherein the lofting agent comprises expandable microspheres, and wherein the porous thermoplastic composite article comprises a porosity of 20% to 80%.

In another aspect, a method of producing a porous composite article comprises combining reinforcing fibers, bicomponent fibers and a thermoplastic material in a liquid to produce an aqueous foam, wherein the bicomponent fibers comprise a core-shell arrangement, wherein a shell material in the shell of the core-shell arrangement comprises a melting point that is substantially similar to a melting point of the thermoplastic material, and wherein a core material in the core of the core-shell arrangement comprises a melting point that is at least twenty degrees Celsius higher than the melting point of the thermoplastic material. In some examples, the method comprises depositing the aqueous foam onto a moving wire screen. In other examples, the method comprises removing liquid from the deposited aqueous foam on the moving wire screen to form a web of open cell structures formed from the thermoplastic material, the reinforcing fibers and the bicomponent fibers. The method can also include depositing a lofting agent onto the formed web. The method can also include compressing the formed web comprising the deposited lofting agent to provide the porous composite article.

In an additional aspect, a method of producing a porous composite article comprises combining reinforcing fibers, bicomponent fibers and a thermoplastic material in a liquid to produce an aqueous foam, wherein the bicomponent fibers comprise a side-by-side arrangement, wherein a first fiber in the side-by-side arrangement comprises a melting point that is substantially similar to a melting point of the thermoplastic material, and wherein a second fiber in the side-by-side arrangement comprises a melting point that is at least twenty degrees Celsius higher than the melting point of the thermoplastic material. In some examples, the method comprises depositing the aqueous foam onto a moving wire screen. The method can also comprise removing liquid from the deposited aqueous foam on the moving wire screen to form a web of open cell structures formed from the thermoplastic material, the reinforcing fibers and the bicomponent fibers. The method can include depositing a lofting agent onto the formed web. The method may also include compressing the formed web comprising the deposited lofting agent to provide the porous composite article.

In another aspect, a method of producing a porous composite article comprises combining inorganic reinforcing fibers, organic reinforcing fibers, a thermoplastic material and a lofting agent in a liquid to produce an aqueous foam, wherein the organic reinforcing fibers comprise a core-shell arrangement, wherein a shell material in the shell of the core-shell arrangement comprises a melting point that is substantially similar to a melting point of the thermoplastic material, and wherein a core material in the core of the core-shell arrangement comprises a melting point that is at least twenty degrees Celsius higher than the melting point of the thermoplastic material. The method can also include depositing the aqueous foam onto a moving wire screen. The method can also include removing liquid from the deposited aqueous foam on the moving wire screen to form a web of open cell structures formed from the thermoplastic material, the inorganic reinforcing fibers and the organic reinforcing fibers, wherein the formed web comprises the lofting agent trapped in the web. The method can also include compressing the formed web comprising the deposited lofting agent to provide the porous composite article.

In another aspect, a method of producing a porous composite article comprises combining inorganic reinforcing fibers, organic reinforcing fibers, a thermoplastic material and a lofting agent in a liquid to produce an aqueous foam, wherein the organic reinforcing fibers comprise a side-by-side arrangement, wherein a first fiber in the side-by-side arrangement comprises a melting point that is substantially similar to a melting point of the thermoplastic material, and wherein a second fiber of the side-by-side arrangement comprises a melting point that is at least twenty degrees Celsius higher than the melting point of the thermoplastic material. The method can also include depositing the aqueous foam onto a moving wire screen. The method can also include removing liquid from the deposited aqueous foam on the moving wire screen to form a web of open cell structures formed from the thermoplastic material, the inorganic reinforcing fibers and the organic reinforcing fibers, wherein the formed web comprises the lofting agent trapped in the web. The method can also include compressing the formed web comprising the deposited lofting agent to provide the porous composite article.

In an additional aspect, a method of producing a porous composite article comprises combining reinforcing fibers, bicomponent fibers, a thermoplastic material and a lofting agent in a liquid to produce an aqueous foam, wherein the bicomponent fibers comprise a core-shell arrangement, wherein a shell material in the shell of the core-shell arrangement comprises a melting point that is substantially similar to a melting point of the thermoplastic material, and wherein a core material in the core of the core-shell arrangement comprises a melting point that is at least twenty degrees Celsius higher than the melting point of the thermoplastic material. The method can also include depositing the aqueous foam onto a moving wire screen. The method can also include removing liquid from the deposited aqueous foam on the moving wire screen to form a web of open cell structures formed from the thermoplastic material, the reinforcing fibers and the bicomponent fibers, wherein the formed web comprises the lofting agent trapped in the web, and compressing the formed web comprising the deposited lofting agent to provide the porous composite article.

In another aspect, a method of producing a porous composite article comprises combining reinforcing fibers, bicomponent fibers, a thermoplastic material and a lofting agent in a liquid to produce an aqueous foam, wherein the bicomponent fibers comprise a side-by-side arrangement, wherein a first fiber in the side-by-side arrangement comprises a melting point that is substantially similar to a melting point of the thermoplastic material, and wherein a second fiber in the side-by-side arrangement comprises a melting point that is at least twenty degrees Celsius higher than the melting point of the thermoplastic material. The method can also include depositing the aqueous foam onto a moving wire screen. The method can also include removing liquid from the deposited aqueous foam on the moving wire screen to form a web of open cell structures formed from the thermoplastic material, the reinforcing fibers and the bicomponent fibers, wherein the formed web comprises the lofting agent trapped in the web. The method can also include compressing the formed web comprising the deposited lofting agent to provide the porous composite article.

Additional aspects, examples, embodiments and configurations are described in more detail below.

BRIEF DESCRIPTION OF THE SEVERAL VIEWS OF THE FIGURES

Certain aspects, embodiments and examples are described with reference to the accompanying figures in which.

It will be recognized by the person of ordinary skill in the art that the depictions and layers in the figures are provided merely for illustration purposes. No particular thickness, materials, dimensions of the like are intended to be implied or required unless otherwise described clearly in the description herein in connection with that particular illustration.

DETAILED DESCRIPTION

Certain examples are described herein of methods that can use a combination of thermoplastic materials and different fibers to enhance retention of lofting agents. In some examples, lofting agent retention may be at least 50% by volume or better in the presence of the different fibers and thermoplastic materials. The ability to retain more lofting agent reduces the amount of material needed, the cost to produce the articles and can provide for a better distribution of the lofting agent in the articles.

In certain embodiments, the articles produced herein are described in certain instances as light weight reinforced thermoplastic (LWRT) articles. In general, the articles comprise a core layer comprising a web formed from thermoplastic material, reinforcing fibers and bicomponent fibers. The presence of the combined material can assist in retention of lofting agents such as, for example, microsphere lofting agents in the web of the core layer.

In certain configurations, the bicomponent fibers of the core layer may comprise two or more different materials that can be arranged in numerous different ways. For example, the bicomponent fibers can be configured as a core-shell arrangement, a side-by-side arrangement or a combination of these arrangements with a shell surrounding a side-by-side arrangement of the fibers. The different fibers can be extruded, co-extruded, drawn or produced in similar manners that are used to produce fibers. In some examples, the produced fiber can be coated in another material to provide the shell around a core fiber. Where more than a single fiber is present in the shell, the fibers can be coaxial, e.g., remain untwisted, or may cross over or be twisted as desired.

Figure 1:
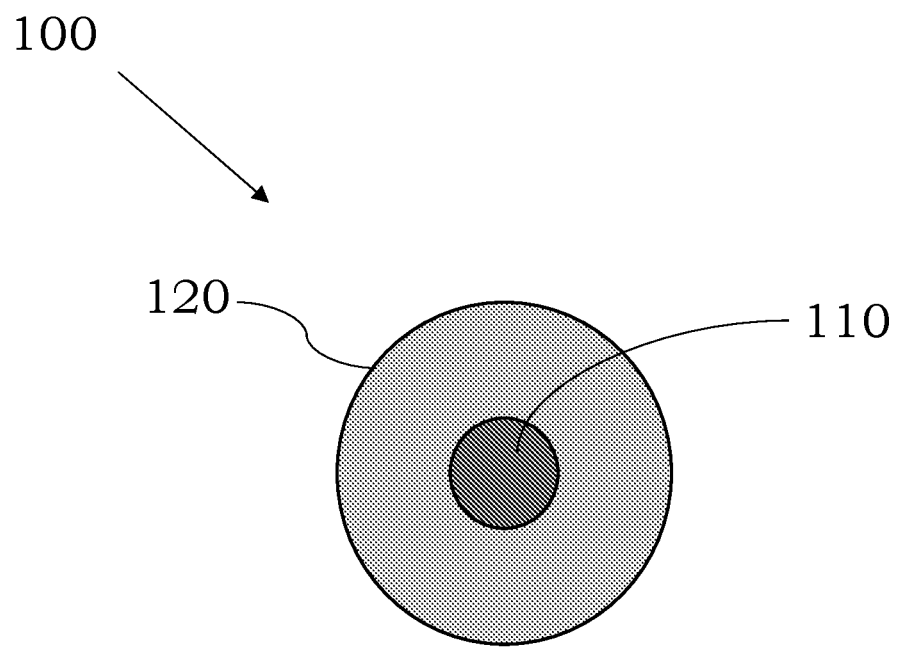
FIG. 1 is an illustration of a core-shell fiber arrangement, in accordance with some examples.

Referring to FIG. 1, an illustration showing a cross-section through a core-shell arrangement of bicomponent fibers is shown. The bicomponent fiber 100 comprises a core material 110 surrounded by a shell material 120. Each of the components 110, 120 may not be a fiber in the true sense, but together the materials of the core 110 and the shell 120 form a fiber. Alternatively, each of the materials 110, 120 could be considered a fiber. The shell material 120 need not completely surround the core material 110 or by symmetric. Without wishing to be bound by any particular theory, the shell material 120 is selected so it is compatible with the thermoplastic material, e.g., the thermoplastic resin, used to produce the core layer. For example, a melting point of the shell material 120 can be about the same or the same as a melting point of the thermoplastic material of the core layer. In some examples, the melting points of the shell material 120 and the thermoplastic material may differ by about one to about ten degrees Celsius and the materials can still be considered compatible.

In certain embodiments, the core material 110 typically comprises a higher melting point than the shell material 120 and the thermoplastic material. For example, as the core layer is formed, the shell material 120 and the thermoplastic material can be melted or softened to form the web of the core layer. The core material 110 typically remains solid and does not melt of soften to any substantial degree during processing of the materials to form the core layer.

In certain examples, a melting point of the core material 110 is at least fifteen degrees Celsius higher than a melting point of the shell material 120 or the melting point of the thermoplastic material. In some examples, a melting point of the core material 110 is at least twenty degrees Celsius higher than a melting point of the shell material 120 or the melting point of the thermoplastic material. In other examples, a melting point of the core material 110 is at least twenty-five degrees Celsius higher than a melting point of the shell material 120 or the melting point of the thermoplastic material. In other examples, a melting point of the core material 110 is at least thirty degrees Celsius higher than a melting point of the shell material 120 or the melting point of the thermoplastic material. In certain examples, a melting point of the core material 110 is at least thirty-five degrees Celsius higher than a melting point of the shell material 120 or the melting point of the thermoplastic material. In certain embodiments, a melting point of the core material 110 is at least forty degrees Celsius higher than a melting point of the shell material 120 or the melting point of the thermoplastic material. In other embodiments, a melting point of the core material 110 is at least forty-five degrees Celsius higher than a melting point of the shell material 120 or the melting point of the thermoplastic material. In other embodiments, a melting point of the core material 110 is at least fifty degrees Celsius higher than a melting point of the shell material 120 or the melting point of the thermoplastic material.

In certain configurations, the materials present in the shell 120 and the core 110 are not the same material. For example, the shell material 120 may comprise a polyolefin and the core material 110 may comprise a material with a melting point higher than the melting point of the polyolefin of the shell material 120. In other instances, the core material 110 may comprise a polyester, a polyamide or a co-polyamide and the shell material 120 may comprise a material with a lower melting point than a melting point of the polyester, a polyamide or a co-polyamide in the core material 110. In additional examples, the shell material 120 may comprise a polyolefin and the core material 110 may comprise a polyester, a polyamide or a co-polyamide. In some examples, the shell material 120 comprises a polyolefin and the core material 110 comprises a polyester. In other examples, the shell material 120 comprises a polyolefin and the core material 110 comprises a polyamide. In some examples, the shell material 120 comprises a polyolefin and the core material comprises a co-polyamide.

In some examples, the polyolefin of the shell material 120 may be polyethylene, polypropylene or other olefinic polymers and co-polymers. In some embodiments, the polyolefin material of the shell 120 may be considered a linear low density polyolefin. For example, the polyolefin material of the shell 120 may be a linear low density polyethylene (LLDPE) or a low density polyethylene (LDPE). While the exact material properties can vary, a linear low density polyethylene may comprise a density of about 0.91 g/cm3 to about 0.94 g/cm3. In some examples, a melting point of the LLDPE or LDPE can be at least fifteen degrees Celsius lower than a melting point of the core material 110. In certain examples, a melting point of the LLDPE or LDPE can be at least twenty degrees Celsius lower than a melting point of the core material 110. In other examples, of the LLDPE or LDPE can be at least twenty-five degrees Celsius lower than a melting point of the core material 110. In certain examples, a melting point of the LLDPE or LDPE can be at least thirty degrees Celsius lower than a melting point of the core material 110. In other examples, a melting point of the LLDPE or LDPE can be at least thirty-five degrees Celsius lower than a melting point of the core material 110. In certain examples, a melting point of the LLDPE or LDPE can be at least forty degrees Celsius lower than a melting point of the core material 110. In other examples, a melting point of the LLDPE or LDPE can be at least forty-five degrees Celsius lower than a melting point of the core material 110. In some examples, a melting point of the LLDPE or LDPE can be at least fifty degrees Celsius lower than a melting point of the core material 110.

In other examples, the core material 110 may comprise a polyester comprising monomeric units of a terephthalate. For example, the polyester may be polyethylene terephthalate, polybutylene terephthalate or polynaphthalene terephthalate. In certain examples, a melting point of the polyester comprising monomeric units of a terephthalate in the core material 110 may be at least fifteen degrees higher than a melting point of material in the shell material 120. In some examples, a melting point of the polyester comprising monomeric units of a terephthalate in the core material 110 may be at least twenty degrees higher than a melting point of material in the shell material 120. In certain examples, a melting point of the polyester comprising monomeric units of a terephthalate in the core material 110 may be at least twenty-five degrees higher than a melting point of material in the shell material 120. In other examples, a melting point of the polyester comprising monomeric units of a terephthalate in the core material 110 may be at least thirty degrees higher than a melting point of material in the shell material 120. In certain examples, a melting point of the polyester comprising monomeric units of a terephthalate in the core material 110 may be at least thirty-five degrees higher than a melting point of material in the shell material 120. In some examples, a melting point of the polyester comprising monomeric units of a terephthalate in the core material 110 may be at least forty degrees higher than a melting point of material in the shell material 120. In other examples, a melting point of the polyester comprising monomeric units of a terephthalate in the core material 110 may be at least forty-five degrees higher than a melting point of material in the shell material 120. In additional examples, a melting point of the polyester comprising monomeric units of a terephthalate in the core material 110 may be at least fifty degrees higher than a melting point of material in the shell material 120.

In some embodiments, the core material 110 may comprise a polyamide or a co-polyamide. For example, the core material 110 may comprise nylon, nylon 66, aramid, polyesteramides, polyetheramides, polyetheresteramides, or other polyamide-containing copolymers. In certain examples, a melting point of the polyamide or co-polyamide in the core material 110 may be at least fifteen degrees higher than a melting point of material in the shell material 120. In some examples, a melting point of the polyamide or co-polyamide in the core material 110 may be at least twenty degrees higher than a melting point of material in the shell material 120. In certain examples, a melting point of the polyamide or co-polyamide in the core material 110 may be at least twenty-five degrees higher than a melting point of material in the shell material 120. In other examples, a melting point of the polyamide or co-polyamide in the core material 110 may be at least thirty degrees higher than a melting point of material in the shell material 120. In certain examples, a melting point of the polyamide or co-polyamide in the core material 110 may be at least thirty-five degrees higher than a melting point of material in the shell material 120. In some examples, a melting point of the polyamide or co-polyamide in the core material 110 may be at least forty degrees higher than a melting point of material in the shell material 120. In other examples, a melting point of the polyamide or co-polyamide in the core material 110 may be at least forty-five degrees higher than a melting point of material in the shell material 120. In additional examples, a melting point of the polyamide or co-polyamide in the core material 110 may be at least fifty degrees higher than a melting point of material in the shell material 120.

In certain examples, the shell material 120 may comprise a polyethylene, e.g., a LLDPE, and the core material 110 may comprise a polyester or a polyamide. For example, the core material 110 may comprise nylon, polyethylene terephthalate, polybutylene terephthalate, polynaphthalene terephthalate, or combinations thereof. In certain examples, a melting point of the polyester or polyamide in the core material 110 may be at least fifteen degrees higher than a melting point of the polyethylene material in the shell material 120. In some examples, a melting point of the polyester or polyamide in the core material 110 may be at least twenty degrees higher than a melting point of the polyethylene material in the shell material 120. In certain examples, a melting point of the polyester or polyamide in the core material 110 may be at least twenty-five degrees higher than a melting point of the polyethylene material in the shell material 120. In other examples, a melting point of the polyester or polyamide in the core material 110 may be at least thirty degrees higher than a melting point of the polyethylene material in the shell material 120. In certain examples, a melting point of the polyester or polyamide in the core material 110 may be at least thirty-five degrees higher than a melting point of the polyethylene material in the shell material 120. In some examples, a melting point of the polyester or polyamide in the core material 110 may be at least forty degrees higher than a melting point of the polyethylene material in the shell material 120. In other examples, a melting point of the polyester or polyamide in the core material 110 may be at least forty-five degrees higher than a melting point of the polyethylene material in the shell material 120. In additional examples, a melting point of the polyester or polyamide in the core material 110 may be at least fifty degrees higher than a melting point of the polyethylene material in the shell material 120.

Figure 2:
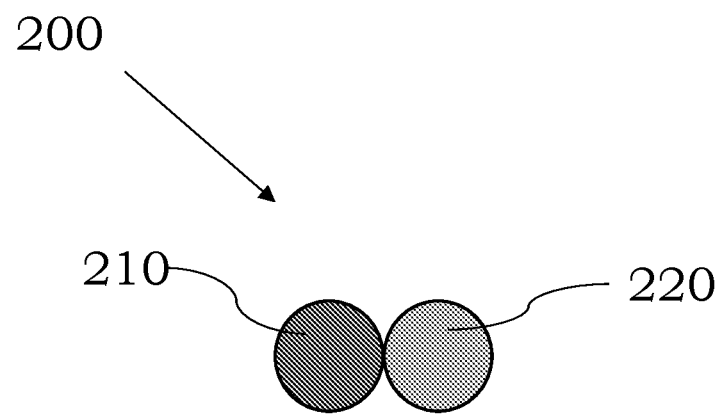
FIG. 2 is an illustration of a side-by-side fiber arrangement, in accordance with certain embodiments.

In other instances, the bicomponent fibers present in the LWRT articles may comprise a side-to-side fiber arrangement. Referring to FIG. 2, an illustration showing a cross-section through a side-by-side fiber arrangement of bicomponent fibers is shown. The bicomponent fiber 200 comprise a first fiber 210 arranged to the side of a second fiber 220. The fibers 210, 220 can be twisted around each other or may remain untwisted and run generally co-axial with each other throughout the fiber 200. Without wishing to be bound by any particular theory, a melting point of materials in one of the fibers 210, 220 is typically about the same as or the same as a melting point of the thermoplastic material of the core layer. In some examples, the melting points of one of the fibers 210, 220 and the thermoplastic material may differ by about one to about ten degrees Celsius and the materials can still be considered compatible.

In certain embodiments, the fiber 210 typically comprises a higher melting point than the other fiber 220 and the thermoplastic material. For example, as the core layer is formed, the fiber 220 and the thermoplastic material can be melted or softened to form the web of the core layer. The fiber 210 typically remains solid and does not melt of soften to any substantial degree during processing of the materials to form the core layer. In certain examples, a melting point of the fiber 210 is at least fifteen degrees Celsius higher than a melting point of the fiber 220 or the melting point of the thermoplastic material. In some examples, a melting point of the fiber 210 is at least twenty degrees Celsius higher than a melting point of the fiber 220 or the melting point of the thermoplastic material. In other examples, a melting point of the fiber 210 is at least twenty-five degrees Celsius higher than a melting point of the fiber 220 or the melting point of the thermoplastic material. In other examples, a melting point of the fiber 210 is at least thirty degrees Celsius higher than a melting point of the fiber 220 or the melting point of the thermoplastic material. In certain examples, a melting point of the fiber 210 is at least thirty-five degrees Celsius higher than a melting point of the fiber 220 or the melting point of the thermoplastic material. In certain embodiments, a melting point of the fiber 210 is at least forty degrees Celsius higher than a melting point of the fiber 220 or the melting point of the thermoplastic material. In other embodiments, a melting point of the fiber 210 is at least forty-five degrees Celsius higher than a melting point of the fiber 220 or the melting point of the thermoplastic material. In other embodiments, a melting point of the fiber 210 is at least fifty degrees Celsius higher than a melting point of the fiber 220 or the melting point of the thermoplastic material.

In certain configurations, the materials present in the fibers 210, 220 are not the same material. For example, the fiber 220 may comprise a polyolefin and the fiber 210 may comprise a material with a melting point higher than the melting point of the polyolefin of the shell material 120. In other instances, the fiber 210 may comprise a polyester, a polyamide or a co-polyamide and the fiber 220 may comprise a material with a lower melting point than a melting point of the polyester, a polyamide or a co-polyamide in the fiber 210. In additional examples, the fiber 220 may comprise a polyolefin and the fiber 210 may comprise a polyester, a polyamide or a co-polyamide. In some examples, the fiber 220 comprises a polyolefin and the fiber 210 comprises a polyester. In other examples, the fiber 220 comprises a polyolefin and the fiber 210 comprises a polyamide. In some examples, the fiber 220 comprises a polyolefin and the fiber 210 comprises a co-polyamide.

In some examples, the polyolefin of the fiber 220 may be polyethylene, polypropylene or other olefinic polymers and co-polymers. In some embodiments, the polyolefin material of the fiber 220 may be considered a linear low density polyolefin. For example, the polyolefin material of the fiber 220 may be a linear low density polyethylene (LLDPE) or a low density polyethylene (LDPE). While the exact material properties can vary, a linear low density polyethylene may comprise a density of about 0.91 g/cm3 to about 0.94 g/cm3. In some examples, a melting point of the LLDPE or LDPE can be at least fifteen degrees Celsius lower than a melting point of the fiber 210. In certain examples, a melting point of the LLDPE or LDPE can be at least twenty degrees Celsius lower than a melting point of the fiber 210. In other examples, a melting point of the LLDPE or LDPE can be at least twenty-five degrees Celsius lower than a melting point of the fiber 210. In certain examples, a melting point of the LLDPE or LDPE can be at least thirty degrees Celsius lower than a melting point of the core material 110. In other examples, a melting point of the LLDPE or LDPE can be at least thirty-five degrees Celsius lower than a melting point of the fiber 210. In certain examples, a melting point of the LLDPE or LDPE can be at least forty degrees Celsius lower than a melting point of the fiber 210. In other examples, a melting point of the LLDPE or LDPE can be at least forty-five degrees Celsius lower than a melting point of the fiber 210. In some examples, a melting point of the LLDPE or LDPE can be at least fifty degrees Celsius lower than a melting point of the fiber 210.

In other examples, the fiber 210 may comprise a polyester comprising monomeric units of a terephthalate. For example, the polyester may be polyethylene terephthalate, polybutylene terephthalate or polynaphthalene terephthalate. In certain examples, a melting point of the polyester comprising monomeric units of a terephthalate in the fiber 210 may be at least fifteen degrees higher than a melting point of material in the fiber 220. In some examples, a melting point of the polyester comprising monomeric units of a terephthalate in the fiber 210 may be at least twenty degrees higher than a melting point of material in the fiber 220. In certain examples, a melting point of the polyester comprising monomeric units of a terephthalate in the fiber 210 may be at least twenty-five degrees higher than a melting point of material in the fiber 220. In other examples, a melting point of the polyester comprising monomeric units of a terephthalate in the fiber 210 may be at least thirty degrees higher than a melting point of material in the fiber 220. In certain examples, a melting point of the polyester comprising monomeric units of a terephthalate in the fiber 210 may be at least thirty-five degrees higher than a melting point of material in the fiber 220. In some examples, a melting point of the polyester comprising monomeric units of a terephthalate in the fiber 210 may be at least forty degrees higher than a melting point of material in the fiber 220. In other examples, a melting point of the polyester comprising monomeric units of a terephthalate in the fiber 210 may be at least forty-five degrees higher than a melting point of material in the fiber 220. In additional examples, a melting point of the polyester comprising monomeric units of a terephthalate in the fiber 210 may be at least fifty degrees higher than a melting point of material in the fiber 220.

In some embodiments, the fiber 210 may comprise a polyamide or a co-polyamide. For example, the fiber 210 may comprise nylon, nylon 66, aramid, polyesteramides, polyetheramides, polyetheresteramides, or other polyamide-containing copolymers. In certain examples, a melting point of the polyamide or co-polyamide in the fiber 210 may be at least fifteen degrees higher than a melting point of material in the fiber 220. In some examples, a melting point of the polyamide or co-polyamide in the fiber 210 may be at least twenty degrees higher than a melting point of material in the fiber 220. In certain examples, a melting point of the polyamide or co-polyamide in the fiber 210 may be at least twenty-five degrees higher than a melting point of material in the fiber 220. In other examples, a melting point of the polyamide or co-polyamide in the fiber 210 may be at least thirty degrees higher than a melting point of material in the fiber 220. In certain examples, a melting point of the polyamide or co-polyamide in the fiber 210 may be at least thirty-five degrees higher than a melting point of material in the fiber 220. In some examples, a melting point of the polyamide or co-polyamide in the fiber 210 may be at least forty degrees higher than a melting point of material in the fiber 220. In other examples, a melting point of the polyamide or co-polyamide in the fiber 210 may be at least forty-five degrees higher than a melting point of material in the fiber 220. In additional examples, a melting point of the polyamide or co-polyamide in the fiber 210 may be at least fifty degrees higher than a melting point of material in the fiber 220.

In certain examples, the fiber 220 may comprise a polyethylene, e.g., a LLDPE, and the fiber 210 may comprise a polyester or a polyamide. For example, the fiber 210 may comprise nylon, polyethylene terephthalate, polybutylene terephthalate, polynaphthalene terephthalate, or combinations thereof. In certain examples, a melting point of the polyester or polyamide in the fiber 210 may be at least fifteen degrees higher than a melting point of the polyethylene material in the fiber 220. In some examples, a melting point of the polyester or polyamide in the core fiber 210 may be at least twenty degrees higher than a melting point of the polyethylene material in the fiber 220. In certain examples, a melting point of the polyester or polyamide in the fiber 210 may be at least twenty-five degrees higher than a melting point of the polyethylene material in the fiber 220. In other examples, a melting point of the polyester or polyamide in the fiber 210 may be at least thirty degrees higher than a melting point of the polyethylene material in the fiber 220. In certain examples, a melting point of the polyester or polyamide in the fiber 210 may be at least thirty-five degrees higher than a melting point of the polyethylene material in the fiber 220. In some examples, a melting point of the polyester or polyamide in the fiber 210 may be at least forty degrees higher than a melting point of the polyethylene material in the fiber 220. In other examples, a melting point of the polyester or polyamide in the fiber 210 may be at least forty-five degrees higher than a melting point of the polyethylene material in the fiber 220. In additional examples, a melting point of the polyester or polyamide in the fiber 210 may be at least fifty degrees higher than a melting point of the polyethylene material in the fiber 220.

Figure 3A:
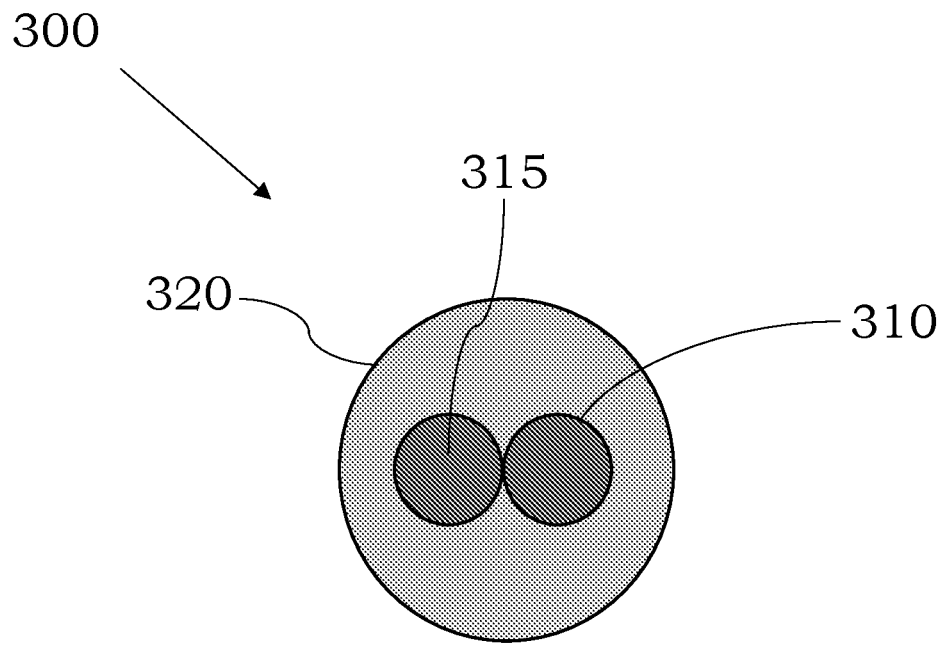
FIGS. 3A and 3B are each illustrations of side-by-side fiber arrangements with a shell, in accordance with some examples.

Referring to FIG. 3A, an illustration showing a cross-section through a side-by-side fiber arrangement with a shell surrounding the side-by-side fiber arrangement of bi-components fibers is shown. For example, the fiber 300 comprises a shell 320 that surrounds two fibers 310, 315. In FIG. 3A, the fibers 310, 315 may comprise the same or similar compositions. For example, each of the fibers 310, 315 may independently comprise the same materials as described in connection with the core material 110 in FIG. 1, e.g., each of the fibers 310, 315 may independently comprise a polyamide, polyester or other polymer.

In certain embodiments, the shell material 320 may comprise a polyolefin. In some examples, the polyolefin of the shell material 320 may be polyethylene, polypropylene or other olefinic polymers and co-polymers. In some embodiments, the polyolefin material of the shell 320 may be considered a linear low density polyolefin. For example, the polyolefin material of the shell 320 may be a linear low density polyethylene (LLDPE) or a low density polyethylene (LDPE). While the exact material properties can vary, a linear low density polyethylene may comprise a density of about 0.91 g/cm3 to about 0.94 g/cm3. In some examples, a melting point of the LLDPE or LDPE can be at least fifteen degrees Celsius lower than a melting point of the fibers 310, 315. In certain examples, a melting point of the LLDPE or LDPE can be at least twenty degrees Celsius lower than a melting point of the fibers 310, 315. In other examples, of the LLDPE or LDPE can be at least twenty-five degrees Celsius lower than a melting point of the fibers 310, 315. In certain examples, a melting point of the LLDPE or LDPE can be at least thirty degrees Celsius lower than a melting point of the fibers 310, 315. In other examples, a melting point of the LLDPE or LDPE can be at least thirty-five degrees Celsius lower than a melting point of the fibers 310, 315. In certain examples, a melting point of the LLDPE or LDPE can be at least forty degrees Celsius lower than a melting point of the fibers 310, 315. In other examples, a melting point of the LLDPE or LDPE can be at least forty-five degrees Celsius lower than a melting point of the fibers 310, 315. In some examples, a melting point of the LLDPE or LDPE can be at least fifty degrees Celsius lower than a melting point of the fibers 310, 315.

In certain examples, the fibers 310, 315 may independently comprise a polyester or a polyamide. In some instances, the fibers 310, 315 independently comprise may comprise nylon, polyethylene terephthalate, polybutylene terephthalate, polynaphthalene terephthalate, or combinations thereof. In certain examples, a melting point of the polyester or polyamide in the fibers 310, 315 may be at least fifteen degrees higher than a melting point of the polyethylene material in the shell material 320. In some examples, a melting point of the polyester or polyamide in the fibers 310, 315 may be at least twenty degrees higher than a melting point of the polyethylene material in the shell material 320. In certain examples, a melting point of the polyester or polyamide in the fibers 310, 315 may be at least twenty-five degrees higher than a melting point of the polyethylene material in the shell material 320. In other examples, a melting point of the polyester or polyamide in the fibers 310, 315 may be at least thirty degrees higher than a melting point of the polyethylene material in the shell material 320. In certain examples, a melting point of the polyester or polyamide in the fibers 310, 315 may be at least thirty-five degrees higher than a melting point of the polyethylene material in the shell material 320. In some examples, a melting point of the polyester or polyamide in the fibers 310, 315 may be at least forty degrees higher than a melting point of the polyethylene material in the shell material 320. In other examples, a melting point of the polyester or polyamide in the fibers 310, 315 may be at least forty-five degrees higher than a melting point of the polyethylene material in the shell material 320. In additional examples, a melting point of the polyester or polyamide in the fibers 310, 315 may be at least fifty degrees higher than a melting point of the polyethylene material in the shell material 320.

Figure 3B:
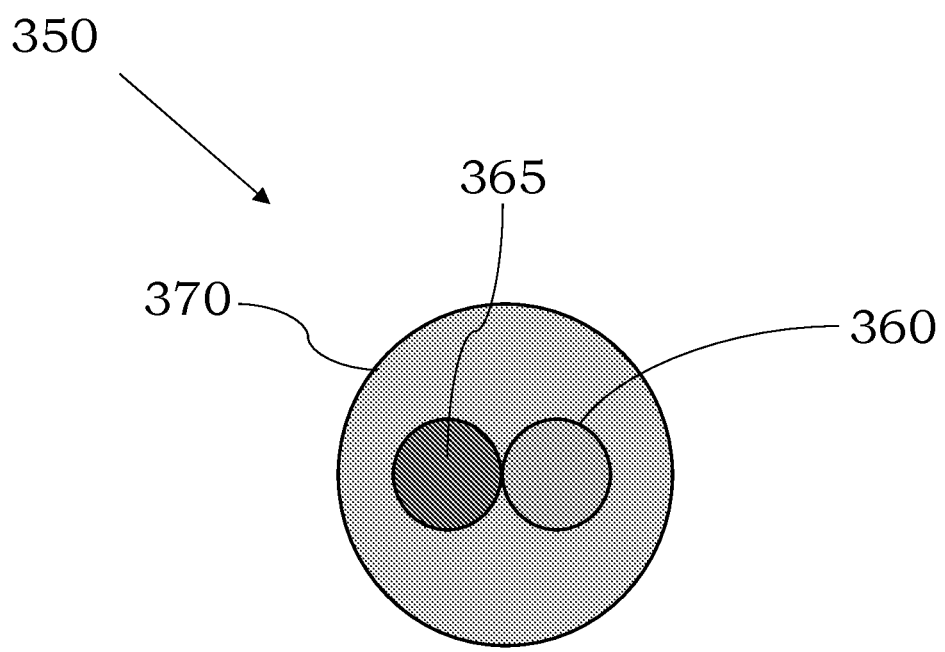

While FIG. 3A shows two side-by-side fibers which may comprise the same composition, this configuration is not required. For example and referring to FIG. 3B, a side-by-side arrangement of fibers 360, 365 surrounded by a shell 370 is shown. The fibers 360, 365 need not have the same composition as each other, but the melting point of each of the fibers 360, 365 is typically higher than a melting point of the shell 370 in the fiber arrangement 350. In one configuration, one of the fibers 360, 365 is a reinforcing fiber as noted below, e.g., inorganic fibers such as glass fibers, graphite fibers, carbon fibers, etc., and the other of the fibers 360, 365 is an organic fiber, e.g., comprises one or more covalently bonded carbon-hydrogen groups. By packaging the inorganic and organic fibers in a shell, addition of the fibers during processing of the materials to form a core layer can be simplified. In other examples, the fibers 360, 365 can each be organic fibers with a different composition.

In certain embodiments, the shell material 370 may comprise a polyolefin. In some examples, the polyolefin of the shell material 370 may be polyethylene, polypropylene or other olefinic polymers and co-polymers. In some embodiments, the polyolefin material of the shell 370 may be considered a linear low density polyolefin. For example, the polyolefin material of the shell 370 may be a linear low density polyethylene (LLDPE) or a low density polyethylene (LDPE). While the exact material properties can vary, a linear low density polyethylene may comprise a density of about 0.91 g/cm3 to about 0.94 g/cm3. In some examples, a melting point of the LLDPE or LDPE can be at least fifteen degrees Celsius lower than a melting point of the fibers 360, 365. In certain examples, a melting point of the LLDPE or LDPE can be at least twenty degrees Celsius lower than a melting point of the fibers 360, 365. In other examples, of the LLDPE or LDPE can be at least twenty-five degrees Celsius lower than a melting point of the fibers 360, 365. In certain examples, a melting point of the LLDPE or LDPE can be at least thirty degrees Celsius lower than a melting point of the fibers 360, 365. In other examples, a melting point of the LLDPE or LDPE can be at least thirty-five degrees Celsius lower than a melting point of the fibers 360, 365. In certain examples, a melting point of the LLDPE or LDPE can be at least forty degrees Celsius lower than a melting point of the fibers 360, 365. In other examples, a melting point of the LLDPE or LDPE can be at least forty-five degrees Celsius lower than a melting point of the fibers 360, 365. In some examples, a melting point of the LLDPE or LDPE can be at least fifty degrees Celsius lower than a melting point of the fibers 360, 365.

In certain examples, the fibers 360, 365 may independently comprise a polyester or a polyamide or one of the fibers 360, 365 may be an inorganic reinforcing fiber. In some instances, the fibers 360, 365 independently comprise may comprise nylon, polyethylene terephthalate, polybutylene terephthalate, polynaphthalene terephthalate, or combinations thereof. In certain examples, a melting point of the materials in the fibers 360, 365 may be at least fifteen degrees higher than a melting point of the polyethylene material in the shell material 370. In some examples, a melting point of the materials in the fibers 360, 365 may be at least twenty degrees higher than a melting point of the polyethylene material in the shell material 370. In certain examples, a melting point of the materials in the fibers 360, 365 may be at least twenty-five degrees higher than a melting point of the polyethylene material in the shell material 370. In other examples, a melting point of the materials in the fibers 360, 365 may be at least thirty degrees higher than a melting point of the polyethylene material in the shell material 370. In certain examples, a melting point of the materials in the fibers 360, 365 may be at least thirty-five degrees higher than a melting point of the polyethylene material in the shell material 320. In some examples, a melting point of the materials in the fibers 360, 365 may be at least forty degrees higher than a melting point of the polyethylene material in the shell material 370. In other examples, a melting point of the materials in the fibers 360, 365 may be at least forty-five degrees higher than a melting point of the polyethylene material in the shell material 370. In additional examples, a melting point of the materials in the fibers 360, 365 may be at least fifty degrees higher than a melting point of the polyethylene material in the shell material 370.

Figure 4:
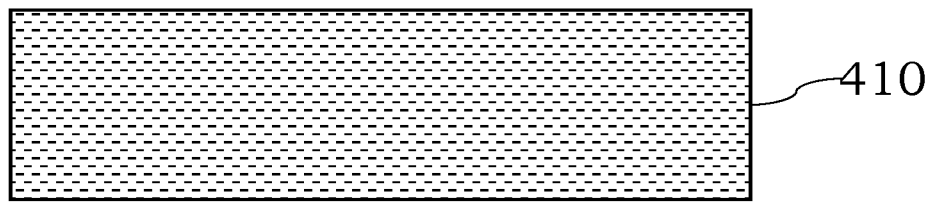
FIG. 4 is an illustration of a core layer, in accordance with some examples.

In certain embodiments and referring to FIG. 4, a core layer 410 is shown that comprises a thermoplastic material, reinforcing fibers, bicomponent fibers and a lofting agent. While not true in all configurations, the lofting agent typically becomes trapped in the voids or pores of the core layer 410. The core layer 410 may first be formed as a prepreg which is generally a precursor to the core layer 410 and is not necessarily fully formed. For ease of illustration, a core layer is described below, though the properties of the core layer may also be the same as a prepreg. The core layer 410 comprises a porous structure to permit gases to flow through the core layer. For example, the core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the core layer 410 comprises a porosity or void content of greater than 0%, e.g., is not fully consolidated, up to about 95%. Unless otherwise stated, the reference to the core layer comprising a certain void content or porosity is based on the total volume of the core layer and not necessarily the total volume of the core layer plus any other materials or layers coupled to the core layer.

In certain embodiments, the thermoplastic material of the core layer 410 may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The virgin thermoplastic material used to form the core layer can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the core layer 410 can vary and illustrative amounts range from about 20% by weight to about 80% by weight. As noted herein, the material of the core layer 410 can be selected such that its melting point is about the same as one of the materials in the bicomponent fibers and is less than a melting point of another material in the bicomponent fibers. Illustrative melting point ranges for the thermoplastic material include, but are not limited to, about 120 degrees Celsius to about 260 degrees Celsius. If desired, thermoplastic materials that melt between 100 degrees Celsius and 315 degrees Celsius can also be used.

In certain examples, the reinforcing fibers of the core layer described herein can comprise glass fibers, carbon fibers, graphite fibers, synthetic organic fibers, particularly high modulus organic fibers such as, for example, para- and meta-aramid fibers, nylon fibers, polyester fibers, or any high melt flow index resins that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some instances, one type of the reinforcing fibers may be used along with mineral fibers such as, for example, fibers formed by spinning or drawing molten minerals. Illustrative mineral fibers include, but are not limited to, mineral wool fibers, glass wool fibers, stone wool fibers, and ceramic wool fibers. In some examples, the reinforcing fibers can be selected to be inorganic fibers, e.g., fibers not including covalently bonded carbon-hydrogen groups.

In some embodiments, any of the aforementioned reinforcing fibers can be chemically treated prior to use to provide desired functional groups or to impart other physical properties to the fibers. The total fiber content in the core layer (reinforcing fibers+bicomponent fibers) may be from about 20% to about 90% by weight of the core layer, more particularly from about 30% to about 70%, by weight of the core layer. Typically, the total fiber content of a composite article comprising the core layer varies between about 20% to about 90% by weight, more particularly about 30% by weight to about 80% by weight, e.g., about 40% to about 70% by weight of the composite. The particular size and/or orientation of the reinforcing fibers used may depend, at least in part, on the polymer material used and/or the desired properties of the resulting core layer. Suitable additional types of fibers, fiber sizes and amounts will be readily selected by the person of ordinary skill in the art, given the benefit of this disclosure. In one non-limiting illustration, reinforcing fibers dispersed within a thermoplastic material to provide a core layer generally have a diameter of greater than about 5 microns, more particularly from about 5 microns to about 22 microns, and a length of from about 5 mm to about 200 mm. More particularly, the reinforcing fiber diameter may be from about 5 microns to about 22 microns and the fiber length may be from about 5 mm to about 75 mm. In some configurations, the flame retardant material may be present in fiber form. For example, the core layer may comprise a thermoplastic material, reinforcing fibers, bicomponent fibers and fibers comprising a flame retardant material.

In some configurations, the core layer 410 may be a substantially halogen free or halogen free layer to meet the restrictions on hazardous substances requirements for certain applications. In other instances, the core layer 410 may comprise a halogenated flame retardant agent (which can be present in the flame retardant material or may be added in addition to the flame retardant material) such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the core layer 410 may comprise one or more halogens to impart some flame retardancy without the addition of another flame retardant agent. For example, the thermoplastic material may be halogenated in addition to there being a flame retardant material present, or the virgin thermoplastic material may be halogenated and used by itself. Where halogenated flame retardants are present, the flame retardant is desirably present in a flame retardant amount, which can vary depending on the other components which are present. For example, the halogenated flame retardant where present in addition to the flame retardant material may be present in about 0.1 weight percent to about 40 weight percent (based on the weight of the prepreg), more particularly about 0.1 weight percent to about 15 weight percent, e.g., about 5 weight percent to about 15 weight percent. If desired, two different halogenated flame retardants may be added to the core layer 410. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the core layer 410 may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 40 weight percent (based on the weight of the prepreg), more particularly about 5 weight percent to about 40 weight percent, e.g., about 5 weight percent to about 15 weight percent based on the weight of the core layer. If desired, two different substantially halogen free flame retardants may be added to the core layer 410. In certain instances, the core layer 410 described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 40 weight percent (based on the weight of the prepreg or core), more particularly about 5 weight percent to about 40 weight percent, e.g., about 2 weight percent to about 14 weight percent based on the weight of the core layer. The flame retardant agents used in the core layers described herein can be added to the mixture comprising the thermoplastic material, bicomponent fibers and reinforcing fibers (prior to disposal of the mixture on a wire screen or other processing component) or can be added after the core layer 410 is formed.

As noted herein, the core layer 410 may comprise a lofting agent present in the pores or voids of the core layer. The lofting agent may take the form of expandable microspheres whose volume can increase upon exposure to heat or other stimulus. For example, a thickness of the core layer 410 can be increased by expanding the lofting agent. The exact amount of the lofting agent present in the core layer 410 may vary, and illustrative amounts include, but are not limited to, about 0.5 weight percent to about 15 weight percent.

Figure 5:
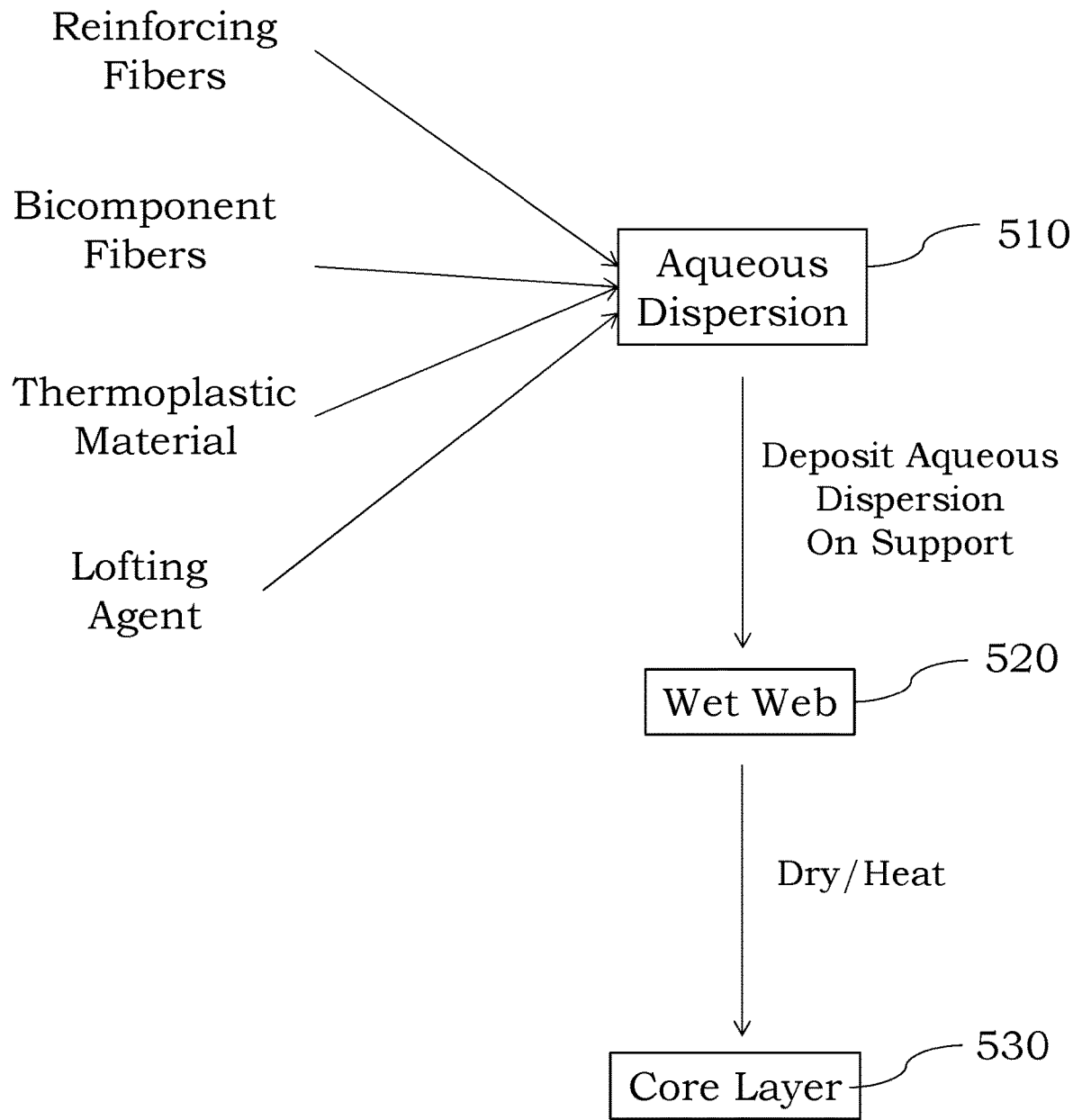
FIG. 5 shows a process that can be used to produce a core layer, in accordance with some examples.

In certain embodiments, the exact amount of the bicomponent fibers in the core layers described herein may vary. In general, the weight percentages of the bicomponent fibers in the core layer may vary from about 2 weight percent to about 30 weight percent. In some examples, about the same amount of bicomponent fibers and reinforcing fibers are present in the core layer In certain embodiments, the core layers and/or articles described herein can be generally prepared using the reinforcing fibers, bicomponent fibers, lofting agent and a thermoplastic material as shown in FIG. 5. To produce the core layer, a thermoplastic material, reinforcing fibers, bicomponent fibers, lofting agent and optionally other materials can be added or metered into a dispersing foam contained in an open top mixing tank fitted with an impeller at a step 510 to provide an aqueous dispersion of the materials. Without wishing to be bound by any particular theory, the presence of trapped pockets of air of the foam can assist in dispersing the reinforcing fibers, the bicomponent fibers, the thermoplastic material, the lofting agent and any other materials. In some examples, the dispersed mixture of fibers, lofting agent and thermoplastic can be pumped to a head-box located above a wire section of a paper machine via a distribution manifold. For example, the aqueous mixture can be deposited on a moving wire screen or other support element at a step 520. The foam, not the fibers, lofting agent or thermoplastic material, can then be removed as the dispersed mixture is provided to a moving support such as a wire screen using a pressure, continuously producing a uniform, fibrous wet web with lofting agent trapped in the web. The wet web can be passed through a dryer at a suitable temperature to reduce moisture content and to melt or soften the thermoplastic material and at least one material of the bicomponent fibers to provide a core layer at step 530. When the hot web exits the dryer, an optional surface or skin layer such as, for example, a textured film may be laminated onto the web by passing the web of reinforcing fiber, bicomponent fibers, thermoplastic material, lofting agent and textured film through the nip of a set of heated rollers. If desired, additional layers such as, for example, another film layer, scrim layer, etc. may also be attached along with the textured film to one side or to both sides of the web to facilitate ease of handling the produced composite. The composite can then be passed through tension rolls and continuously cut (guillotined) into the desired size for later forming into an end composite article. Further information concerning the preparation of such composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

Figure 6:
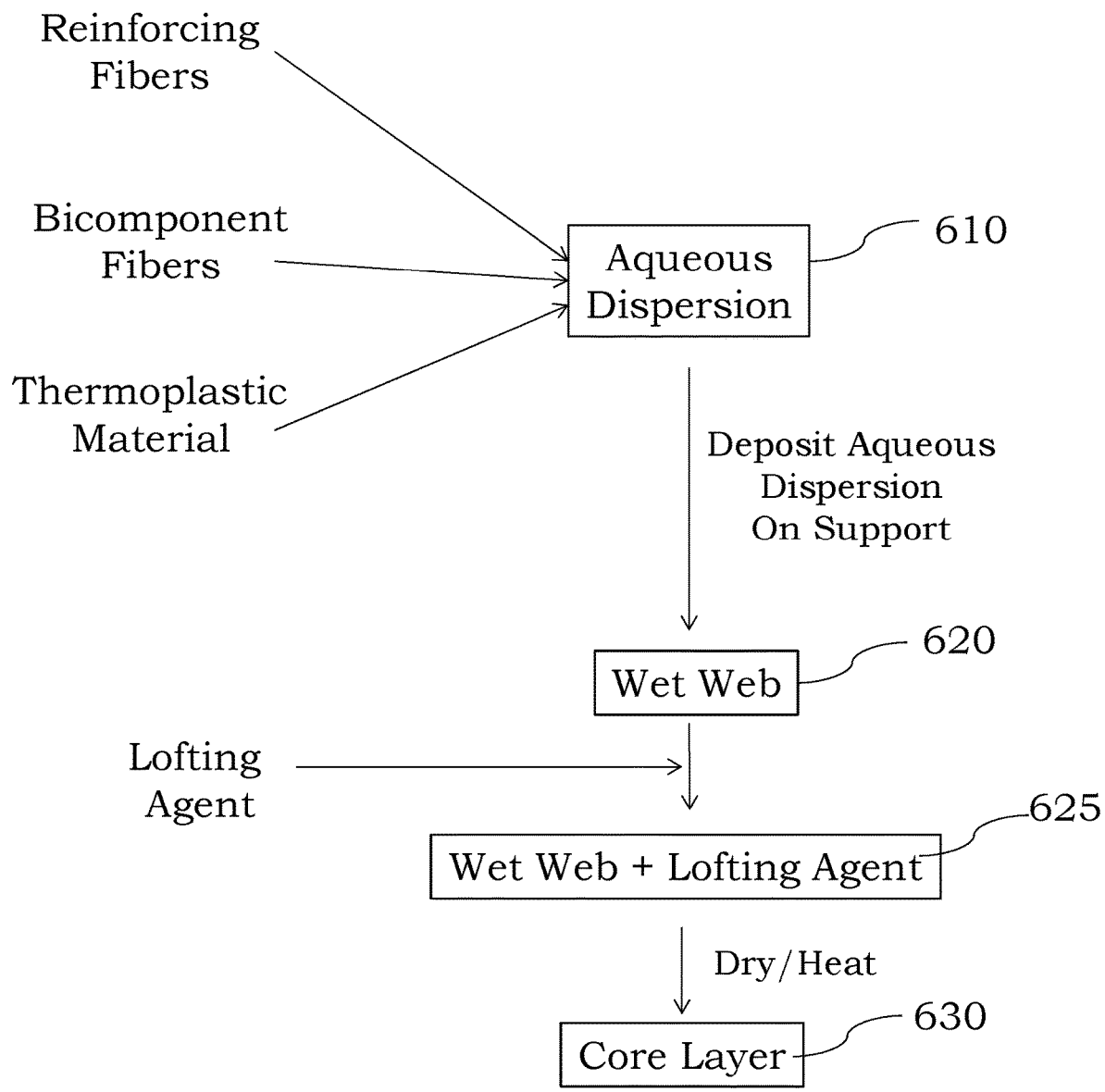
FIG. 6 shows another process that can be used to produce a core layer, in accordance with certain examples.

In another configuration, the core layers and/or articles described herein can be generally prepared using the reinforcing fibers, bicomponent fibers, and a thermoplastic material as shown in FIG. 6. To produce the core layer, a thermoplastic material, reinforcing fibers, bicomponent fibers, and optionally other materials can be added or metered into a dispersing foam contained in an open top mixing tank fitted with an impeller to provide an aqueous dispersion at a step 610. Without wishing to be bound by any particular theory, the presence of trapped pockets of air of the foam can assist in dispersing the reinforcing fibers, the bicomponent fibers, the thermoplastic material, and any other materials. In some examples, the dispersed mixture of fibers and thermoplastic can be pumped to a head-box located above a wire section of a paper machine via a distribution manifold. For example, the aqueous mixture can be deposited on a moving wire screen or other support element at a step 620 to provide a wet web. The foam, not the fibers or thermoplastic material, can then be removed as the dispersed mixture is provided to a moving support such as a wire screen using a pressure, continuously producing a uniform, fibrous wet web. A lofting agent can be then deposited or sprayed on top of the wet web at a step 625 to provide a wet web that includes the lofting agent. The wet web comprising the deposited lofting agent can be passed through a dryer optionally under vacuum or by applying pressure and heat at a suitable temperature to reduce moisture content and to melt or soften the thermoplastic material and at least one material of the bicomponent fibers to provide a core layer at a step 630. When the hot web exits the dryer, an optional surface or skin layer such as, for example, a textured film may be laminated onto the web by passing the web of reinforcing fiber, bicomponent fibers, thermoplastic material, lofting agent and textured film through the nip of a set of heated rollers. If desired, additional layers such as, for example, another film layer, scrim layer, etc. may also be attached along with the textured film to one side or to both sides of the web to facilitate ease of handling the produced composite. The composite can then be passed through tension rolls and continuously cut (guillotined) into the desired size for later forming into an end composite article.

Figure 7:
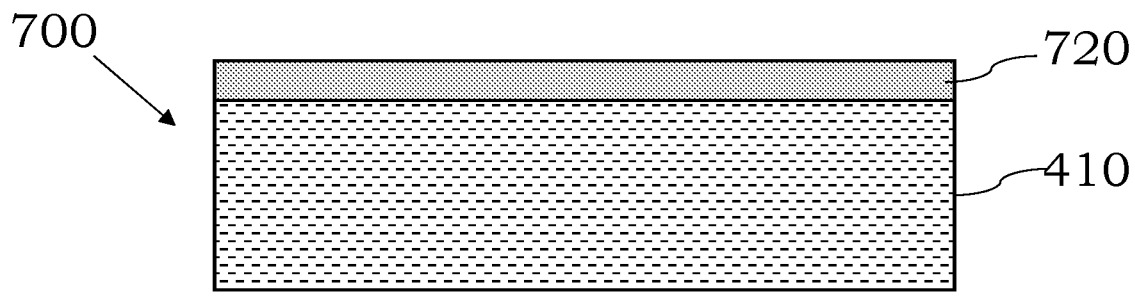
FIG. 7 is an illustration of an article comprising a core layer and a skin layer, in accordance with some examples.

In certain embodiments, the core layers described herein can be used with a skin layer to provide a composite article. Referring to FIG. 7, a skin layer 720 is shown as being disposed on a first surface of the core layer 410 to provide a composite article 700. The skin layer 720 may comprise, for example, a film, a scrim (e.g., fiber based scrim), a frim (film+scrim), a foil, a woven fabric, a non-woven fabric or be present as an inorganic coating, an organic coating, or a thermoset coating disposed on the core layer. In other instances, the layer 720 may comprise a limiting oxygen index greater than about 22, as measured per ISO 4589 dated 1996. Where a fiber based scrim is present as (or as part of) the skin layer 720, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer 720, the coating may comprise at least one of unsaturated polyurethanes, vinyl esters, phenolics and epoxies. Where an inorganic coating is present as (or as part of) the layer 720, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer 720, the non-woven fabric may comprise a thermoplastic material, a thermal setting binder, inorganic fibers, metal fibers, metallized inorganic fibers and metallized synthetic fibers. If desired, an intermediate layer (not shown) can be present between the core layer and the skin layer 720. For example, an adhesive layer or layer of other material can be present between the core layer 410 and the skin layer 720.

Figure 8:
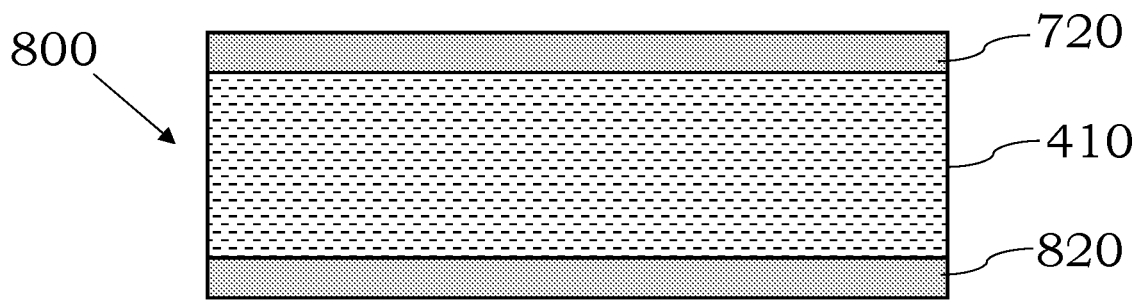
FIG. 8 is an illustration of an article comprising a core layer and two skin layers, in accordance with some examples.

In some examples, a composite article may also comprise a second skin layer disposed on another surface of a core layer. Referring to FIG. 8, a composite article 800 is shown comprising skin layers 720, 820 that sandwich a core layer 410. The layer 820 may be the same or may be different than the layer 720. In some instances, the layer 820 may comprise, for example, a film, a scrim (e.g., fiber based scrim), a frim (film+scrim), a foil, a woven fabric, a non-woven fabric or be present as an inorganic coating, an organic coating, or a thermoset coating disposed on the core layer. In other instances, the layer 820 may comprise a limiting oxygen index greater than about 22, as measured per ISO 4589 dated 1996. Where a fiber based scrim is present as (or as part of) the layer 820, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer 820, the coating may comprise at least one of unsaturated polyurethanes, vinyl esters, phenolics and epoxies. Where an inorganic coating is present as (or as part of) the layer 820, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer 820, the non-woven fabric may comprise a thermoplastic material, a thermal setting binder, inorganic fibers, metal fibers, metallized inorganic fibers and metallized synthetic fibers. If desired, an intermediate layer (not shown) can be present between the core layer and the skin layer 820. For example, an adhesive layer or layer of other material can be present between the core layer 410 and the skin layer 820.

Figure 9:
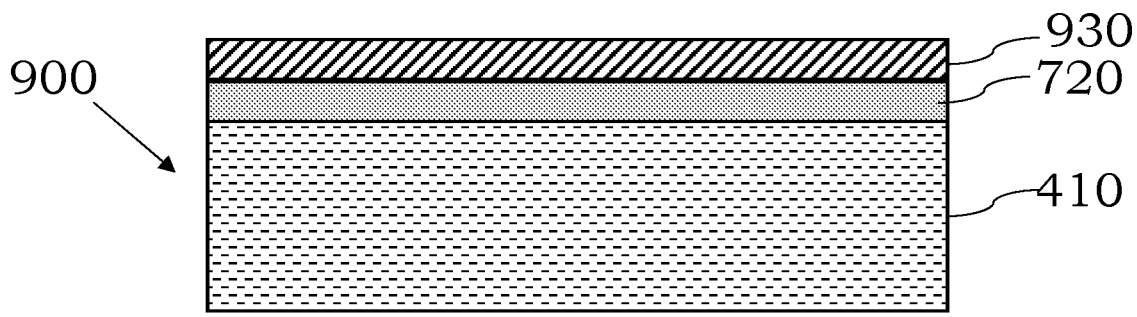
FIG. 9 is an illustration of an article comprising a core layer, a skin layer and a decorative layer, in accordance with some examples.

In certain configurations, a composite article can include a decorative layer disposed on a surface of the core layer or on a skin layer. Referring to FIG. 9, an article 900 is shown that comprises a decorative layer 830 disposed on the skin layer 720. While not shown, a decorative layer could be disposed on an opposite surface of the core layer 410 or can be disposed on the skin layer 820 shown in FIG. 8. In some examples, the decorative layer 930 may be configured as a decorative layer, textured layer, colored layer and the like. For example, a decorative layer 930 may be formed, e.g., from a thermoplastic film of polyvinyl chloride, polyolefins, thermoplastic polyesters, thermoplastic elastomers, or the like. The decorative layer 930 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer 930 may also be produced using spunbond, thermal bonded, spun lace, melt-blown, wet-laid, and/or dry-laid processes. Insulation or sound absorption layers may also be bonded to one or more surfaces of the articles described herein, and the insulation or sound absorption layers may be open or closed, e.g., an open cell foam or a closed cell foam, as desired.

In certain embodiments, the core layers and articles described herein can be used in building and automotive applications such as, for example, headliners, rear window trims, trunk trims, office partition panels, cabinet back panels, interior automotive panels or other interior automotive articles.

Certain specific examples are described to illustrate further some of the aspects of the technology described herein.

Example 1

Several articles were tested for their free loft capability. Free loft can be used as a measure of lofting agent retention. Free loft was measured by punching disks out of the sheet articles. The punched disks were heated in an oven at about 200 degrees Celsius to loft the punched disks. After heating for about five minutes, the lofted disks were removed and allowed to cool for about one minute on a flat surface. The thickness of the lofted disks were then measured Each of the samples tested has a total areal density of 1000 gsm. Table 1 below shows the materials and their amounts used to produce each sample. The difference in free loft in the absence (sample HS1) and presence (HS2) of the bicomponent fibers is also shown. The bicomponent fibers that were used core-shell fibers with the shell comprising LLDPE and the core comprising polyethylene terephthalate.

TABLE 1

| Sample | PP % | Glass fiber % | Polymeric fiber % | Lofting agent % | Free loft |
|---|---|---|---|---|---|
| HS1 | 43.3% | 52.9% | 0.0% | 5.8% | 9.3 mm |
| HS2 | 43.3% | 43.3% | 9.6% | 5.8% | 11.1 mm |

Free loft increased over 20% in the presence of the polymeric bicomponent fibers even though the same amount of lofting agent was used to produce both samples. These results are consistent with the bicomponent fibers providing enhanced retention of the lofting agent, which provides an increase in free loft capacity.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A method of producing a porous composite article comprising:
   combining inorganic reinforcing fibers, organic reinforcing fibers, and a thermoplastic material in a liquid to produce an aqueous foam, wherein the organic reinforcing fibers comprise a side-by-side arrangement, wherein a first fiber in the side-by-side arrangement comprises a melting point that is the same as, or differs by one to ten degrees from, a melting point of the thermoplastic material, and wherein a second fiber of the side-by-side arrangement comprises a melting point that is at least twenty degrees Celsius higher than the melting point of the thermoplastic material;
   depositing the aqueous foam onto a moving wire screen;
   removing liquid from the deposited aqueous foam on the moving wire screen to form a web of open cell structures formed from the thermoplastic material, the inorganic reinforcing fibers and the organic reinforcing fibers;
   depositing a lofting agent onto the formed web; and
   compressing the formed web comprising the deposited lofting agent to provide a porous composite article with free loft from retention of the deposited lofting agent in the porous composite article by the organic reinforcing fibers.

2. The method of claim 1, wherein a negative pressure is provided at a bottom surface of the formed web during depositing of the lofting agent to draw lofting agent into voids of the formed web.

3. The method of claim 2, wherein at least 50% of the deposited lofting agent is retained by the formed web.

4. The method of claim 1, wherein the first fiber of the organic reinforcing fibers comprise a polyolefin and the second fiber of the organic reinforcing fibers comprise a polyester.

5. The method of claim 4, wherein the polyolefin comprises polyethylene.

6. The method of claim 5, wherein the polyethylene is a linear low density polyethylene.

7. The method of claim 6, wherein a density of the linear low density polyethylene is about 0.91 $g/cm^3$ to about 0.94 $g/cm^3$.

8. The method of claim 4, wherein the polyester comprises one or more of polyethylene terephthalate, polybutylene terephthalate and polynaphthalene terephthalate.

9. The method of claim 1, wherein the first fiber of the organic reinforcing fibers comprise a polyolefin and the second fiber of the organic reinforcing fibers comprise a polyamide.

10. The method of claim 9, wherein the polyolefin comprises polyethylene.

11. The method of claim 10, wherein the polyethylene is a linear low density polyethylene.

12. The method of claim 11, wherein a density of the linear low density polyethylene is about 0.91 $g/cm^3$ to about 0.94 $g/cm^3$.

13. The method of claim 9, wherein the polyamide comprises a co-polyamide.

14. The method of claim 9, wherein the polyamide comprises nylon.

15. The method of claim 1, wherein the thermoplastic material comprises a polyolefin, the inorganic reinforcing fibers comprise glass fibers, the organic reinforcing fibers comprises a first fiber comprising a polyolefin and a second fiber comprising a polyester, and wherein the lofting agent comprises expandable microspheres.

16. The method of claim 15, wherein the thermoplastic material is polypropylene, the polyolefin of the first fiber comprises polyethylene and the polyester of the second fiber comprises polyethylene terephthalate.

17. The method of claim 1, wherein the thermoplastic material comprises a polyolefin, the inorganic reinforcing fibers comprise glass fibers, the organic reinforcing fibers comprises a first fiber comprising a polyolefin and a second fiber comprising a polyamide, and wherein the lofting agent comprises expandable microspheres.

18. The method of claim 17, wherein the thermoplastic material is polypropylene, the polyolefin of the first fiber comprises polyethylene and the polyamide of the second fiber comprises nylon.

19. The method of claim 1, wherein the thermoplastic material comprises polypropylene, the inorganic reinforcing fibers comprise glass fibers, the organic reinforcing fibers comprise a first fiber comprising a polyethylene and a second fiber comprising a polyamide, wherein a melting point of the polyamide in the second fiber is at least fifty degrees Celsius higher than a melting point of the polyethylene in the first fiber, wherein the lofting agent comprises expandable microspheres, and wherein the porous composite article comprises a porosity of 20% to 80%.

20. The method of claim 1, wherein the thermoplastic material comprises polypropylene, the inorganic reinforcing fibers comprise glass fibers, the organic reinforcing fibers comprise a first fiber comprising a polyethylene and a second fiber comprising a polyamide, wherein a melting point of the polyamide in the second fiber is at least fifty degrees Celsius higher than a melting point of the polyethylene in the first fiber, wherein the lofting agent comprises expandable microspheres, and wherein the porous composite article comprises a porosity of 20% to 80%.

* * * * *